United States Patent
Yang

(10) Patent No.: US 9,870,538 B2
(45) Date of Patent: Jan. 16, 2018

(54) OPTIMIZING PLACEMENT OF ADVERTISEMENTS ACROSS MULTIPLE PLATFORMS

(75) Inventor: Chen-Huan Jerry Yang, Mendham, NJ (US)

(73) Assignee: International Business Machines Corporation, Armonk, NY (US)

(*) Notice: Subject to any disclaimer, the term of this patent is extended or adjusted under 35 U.S.C. 154(b) by 1889 days.

(21) Appl. No.: 12/714,642

(22) Filed: Mar. 1, 2010

(65) Prior Publication Data

US 2011/0213654 A1 Sep. 1, 2011

(51) Int. Cl.
| | |
|---|---|
| *G06Q 30/00* | (2012.01) |
| *G06Q 10/00* | (2012.01) |
| *G06Q 30/02* | (2012.01) |
| *H04N 21/443* | (2011.01) |
| *H04N 21/45* | (2011.01) |
| *H04N 21/81* | (2011.01) |

(52) U.S. Cl.
CPC ............ *G06Q 10/00* (2013.01); *G06Q 30/00* (2013.01); *G06Q 30/0244* (2013.01); *H04N 21/4431* (2013.01); *H04N 21/4532* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 2003/0083937 A1 | 5/2003 | Hasegawa et al. | |
| 2003/0105677 A1* | 6/2003 | Skinner | 705/26 |
| 2006/0229938 A1 | 10/2006 | Yan | |
| 2008/0103902 A1* | 5/2008 | Burdick | G06Q 30/02 705/14.43 |
| 2008/0167943 A1 | 7/2008 | O'Neil et al. | |
| 2008/0249855 A1* | 10/2008 | Collins et al. | 705/14 |
| 2008/0281661 A1 | 11/2008 | Young et al. | |
| 2009/0106100 A1* | 4/2009 | Mashinsky | G06Q 10/0637 705/14.1 |

\* cited by examiner

*Primary Examiner* — Michael Bekerman
(74) *Attorney, Agent, or Firm* — John R. Pivnichny; Law Office of Jim Boice

(57) ABSTRACT

A computer implemented method, system, and/or computer program product manage advertisement placement across disparate advertisement media platforms. The disparate advertisement media platforms are each coupled to a respective monitoring application. The monitoring applications monitor activities occurring within their respective advertisement media. Data describing the monitored activities is input to a business intelligence core. In response to one or more of the monitoring applications detecting a real-time event related to a specific subject, the business intelligence core adjusts an amount of electronic advertisement in one or more of the disparate advertising media.

18 Claims, 4 Drawing Sheets

OPTIMIZING PLACEMENT OF ADVERTISEMENTS ACROSS MULTIPLE PLATFORMS

BACKGROUND

The present disclosure relates to the field of computers, and specifically to computer systems. Still more particularly, the present disclosure relates to managing linear and non-linear electronic advertisement placement across multiple platforms.

BRIEF SUMMARY

A computer implemented method, system, and/or computer program product manage advertisement placement across disparate advertisement media platforms. The disparate advertisement media platforms are each coupled to a respective monitoring application. The monitoring applications monitor activities occurring within their respective advertisement media. Data describing the monitored activities is input to a business intelligence core. In response to one or more of the monitoring applications detecting a real-time event related to a specific subject, the business intelligence core adjusts an amount of electronic advertisement in one or more of the disparate advertising media.

DETAILED DESCRIPTION

Figure 1:
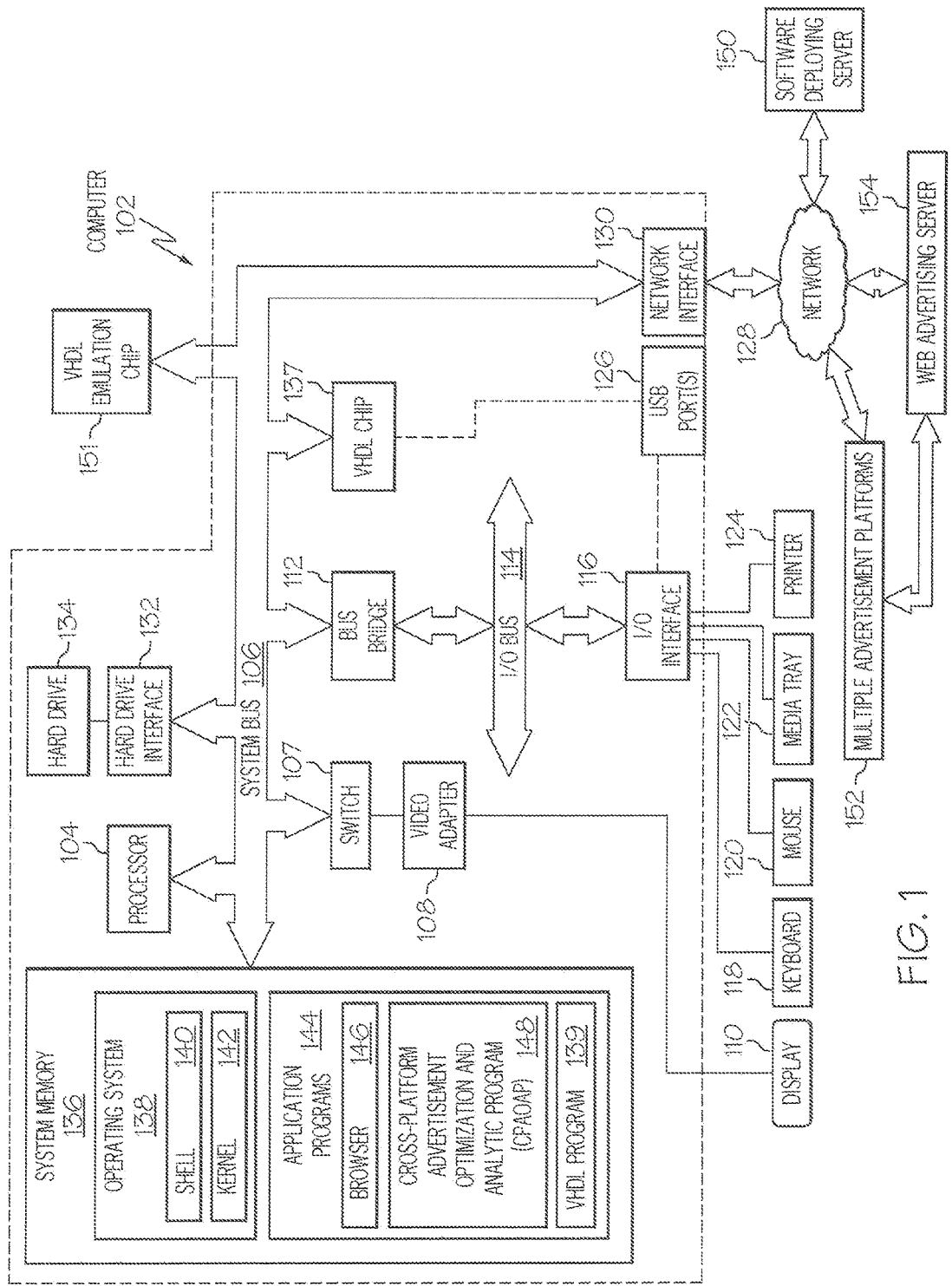
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, multiple advertisement platforms 152, and/or a web advertising server 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., cross-platform advertisement optimization and analytic program—CPAOAP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, multiple advertisement platforms 152, and/or web advertising server 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a cross-platform advertisement optimization and analytic program (CPAOAP) 148. CPAOAP 148 includes code for implementing the processes described below, including those described in FIGS. 2-4. In one embodiment, computer 102 is able to download CPAOAP 148 from software deploying server 150, including in an on-demand basis, wherein the code in CPAOAP 148 is not downloaded until needed for execution to define and/or implement the improved enterprise architecture described herein. Note further that, in one embodiment of the present invention, software deploying server 150 performs all of the functions associated with the present invention (including execution of CPAOAP 148), thus freeing computer 102 from having to use its own internal computing resources to execute CPAOAP 148.

Note that CPAOAP 148 comprises a real-time analytic component used to evaluate objects, applications, data sources, etc. as described herein, including as described below with reference to elements 208, 210 and 212. CPAOAP 148 also comprises code for implementing business intelligence operations, including collecting data from various resources in real-time, as described below.

Note further that CPAOAP 148 can be implemented as a stand-alone network appliance, which is a server (not depicted) having its own memory, hardware, software and interface devices for executing software to provide the functionality described herein.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CPAOAP 148 causes VHDL program 139 to configure VHDL chip 137, which may be an FPGA, ASIC, etc.

In another embodiment of the present invention, execution of instructions from CPAOAP 148 results in a utilization of VHDL program 139 to program a VHDL emulation chip 151. VHDL emulation chip 151 may incorporate a similar architecture as described above for VHDL chip 137. Once CPAOAP 148 and VHDL program 139 program VHDL emulation chip 151, VHDL emulation chip 151 performs, as hardware, some or all functions described by one or more executions of some or all of the instructions found in CPAOAP 148. That is, the VHDL emulation chip 151 is a hardware emulation of some or all of the software instructions found in CPAOAP 148. In one embodiment, VHDL emulation chip 151 is a programmable read only memory (PROM) that, once burned in accordance with instructions from CPAOAP 148 and VHDL program 139, is permanently transformed into a new circuitry that performs the functions needed to perform the process described below in FIGS. 2-4.

The multiple advertisement platforms 152 are disparate platforms for presenting electronic advertisement. These disparate platforms are defined as platforms that each utilizes a unique combination of software and hardware when compared with other platforms within the multiple advertisement platforms 152. Exemplary disparate platforms within the group of multiple advertisement platforms 152 include, but are not limited to, a computer displaying a web page, a television station broadcasting television content, a mobile network receiver presenting mobile content, a video on demand service receiver displaying on-demand content, cable television stations downloading/broadcasting television content, electronic billboards, smart cell phones, video on demand networks, and interactive television (e.g., through the use of a smart set-top box coupled to a network, cable, etc.).

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
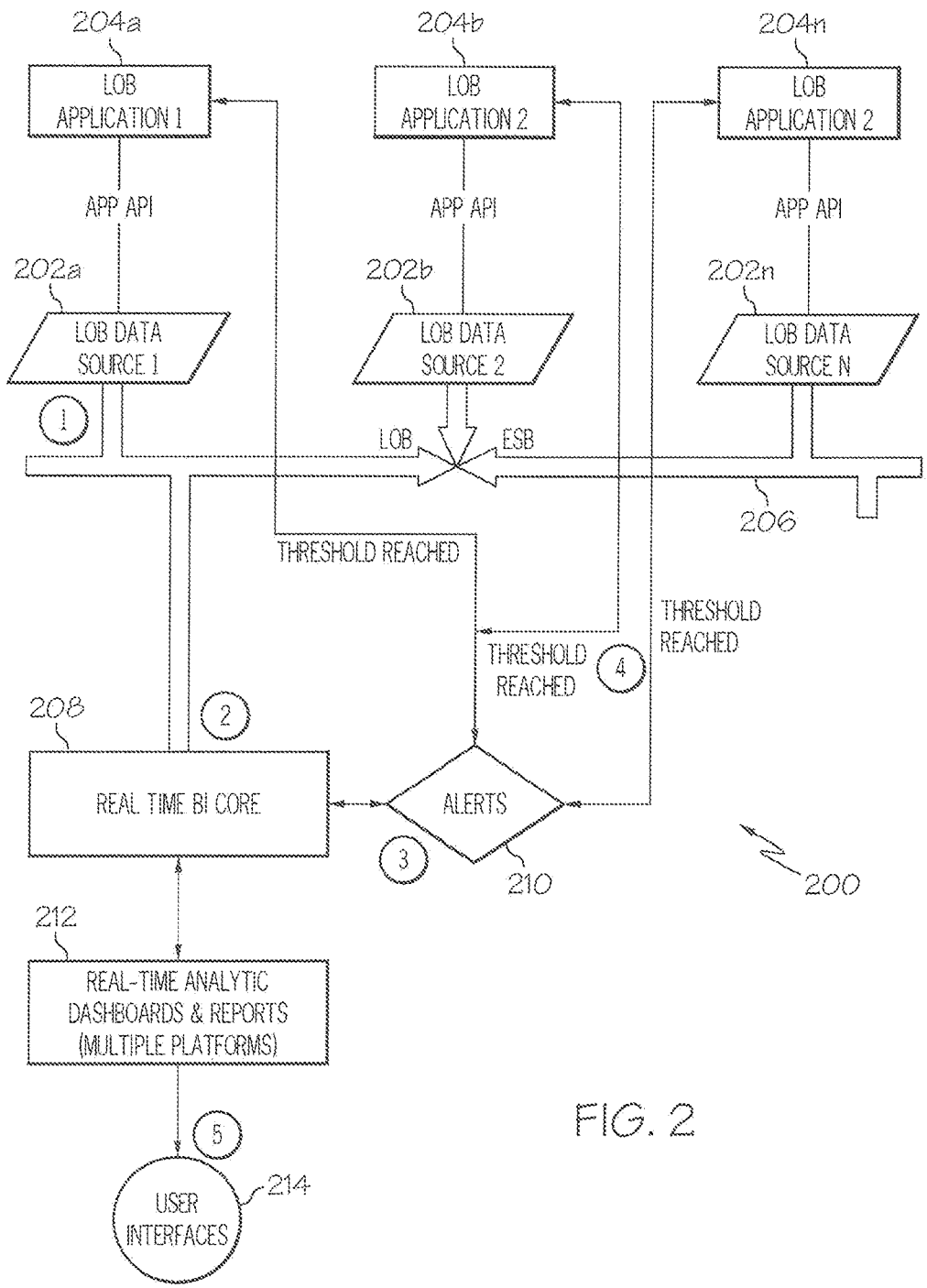
FIG. 2 illustrates a high level process diagram for a business intelligence framework for managing electronic advertisements across disparate platforms.

Referring now to FIG. 2, a high level process diagram 200 describing the provisioning flow for optimizing placement of electronic advertisement is presented. Note that depicted steps 1-5 are described herein in sequence. However, one or more of the steps described may occur in a sequence other than now described.

As shown in step 1, large object (LOB) sources 202a-n (wherein "n" is an integer) are prepared in accordance with the following business and technical parameters.

Business: In a multiple-platforms environment, the LOB data sources 202a-n are identified. Thus, for advertising delivery usage, all advertising delivery platforms (e.g., broadcast television, cable television, webpages, mobile devices such as small cell phones, video on demand (VOD), etc.) are identified as LOB data sources 202a-n.

Technical: All service oriented architecture (SOA) and network connections (application programming interfaces (APIs)) between the advertising delivery platforms (i.e., LOB data sources 202a-n) and LOB applications 204a-n are established. The LOB applications monitor activities within the LOB data sources 202a-n, as well as external activities (e.g., current events, user-set thresholds, etc.) that are described below.

Business: In circumstances where the process described herein is utilized used for multiple-networks environment (e.g., a single broadcast/cable corporation has multiple stations, networks, etc.), each of these networks' LOB applications 204a-n, which will receive data from the LOB data sources 202a-n via respective application programming interfaces (APIs), are identified.

Technical: Web Service APIs and/or open LOB application APIs to a Web Service are defined, and any needed simple object access protocol (SOAP) binding is performed. These APIs may contain messages and can be input or output to their respective LOB applications 204a-n. These APIs are then tested under business factor considerations to ensure their utility for communication with enterprise servers, etc.

Technical: Business intelligence (BI) data connection streams are customized, such as defining an open database connectivity (ODBC) and/or other platform-neutral database connection streams. The data connection streams can have single LOB application API call or complicated structured query language (SQL) or database (DB) store procedures to access the LOB application database associated with the LOB data sources 202a-n directly.

Technical: BI connection streams are defined as Delta access (in which only changes in the LOB data sources 202a-n are transmitted) or FULL data access (in which all descriptors of activities within the LOB data sources 202a-n are transmitted), and then tested to verify that data is being retrieved correctly.

As shown in FIG. 2, a LOB enterprise service bus (ESB) 206 couples the LOB data sources 202a-n to a real time business intelligence (BI) core 208 (step 2). The BI core 208 enables the following BI core processes when designing the data models and the dashboard: BI design principles and business criteria are defined, including, but not limited to, Defining what data should be collected to aid in the allocation and reallocation of electronic advertisements; Defining what format should be used to displayed these data; Defining what business rules are associated with these data; Determining what level of details should be displayed; and Defining the hierarchy and relationship, if any, among these data sets, and among the proposed dashboards. Defining the data models and dashboard design allows for the implementation and testing of: i. BI Dimensions and Metrics; ii. Data formats; iii. Data summary and aggregation; and iv. Data hierarchy definition.

As described in detail below, alerts 210 can be sent to the BI core 208 (step 3), particularly in response to signals/messages from one or more of the LOB applications 204a-n detecting that a threshold has been reached (step 4). This results in the BI core 208 generating real-time analytic dashboards and reports 212 for transmission to a user interface 214 (step 5), such as the display 110 shown in FIG. 1.

When creating a business oriented dashboard, BI design principles and business criteria should be considered and defined, including, but not limited to, Who is the audience?; What are the user interfaces? (Web, Mobile, PDA or another application, etc.); What are the user roles and their authorization to see what data; and Are any messages for specific dashboard segments?

Display widgets scales are defined for multiple dimensions from different platforms. For example, Web Click through rate is always higher than Mobile Video download rate, but with proper scale, like every 800 views per scale for Web measurement and 6 pay-per-views per scale for TV Pay Per View, the BI core 208 provides an overall comparison.

As mentioned above, alerts 210 are a functionality of exceeding thresholds, as defined by the LOB applications 204a-n. However, besides defining and utilizing thresholds, alerts 210 also consider and/or define: What are business rules if a certain condition is met via the collected Real-Time data?; What business process and steps are needed to achieve these business rules?; Who are on the notification list?; What is the content in the notification message?; and What are the confirmation processes?

Figure 3:
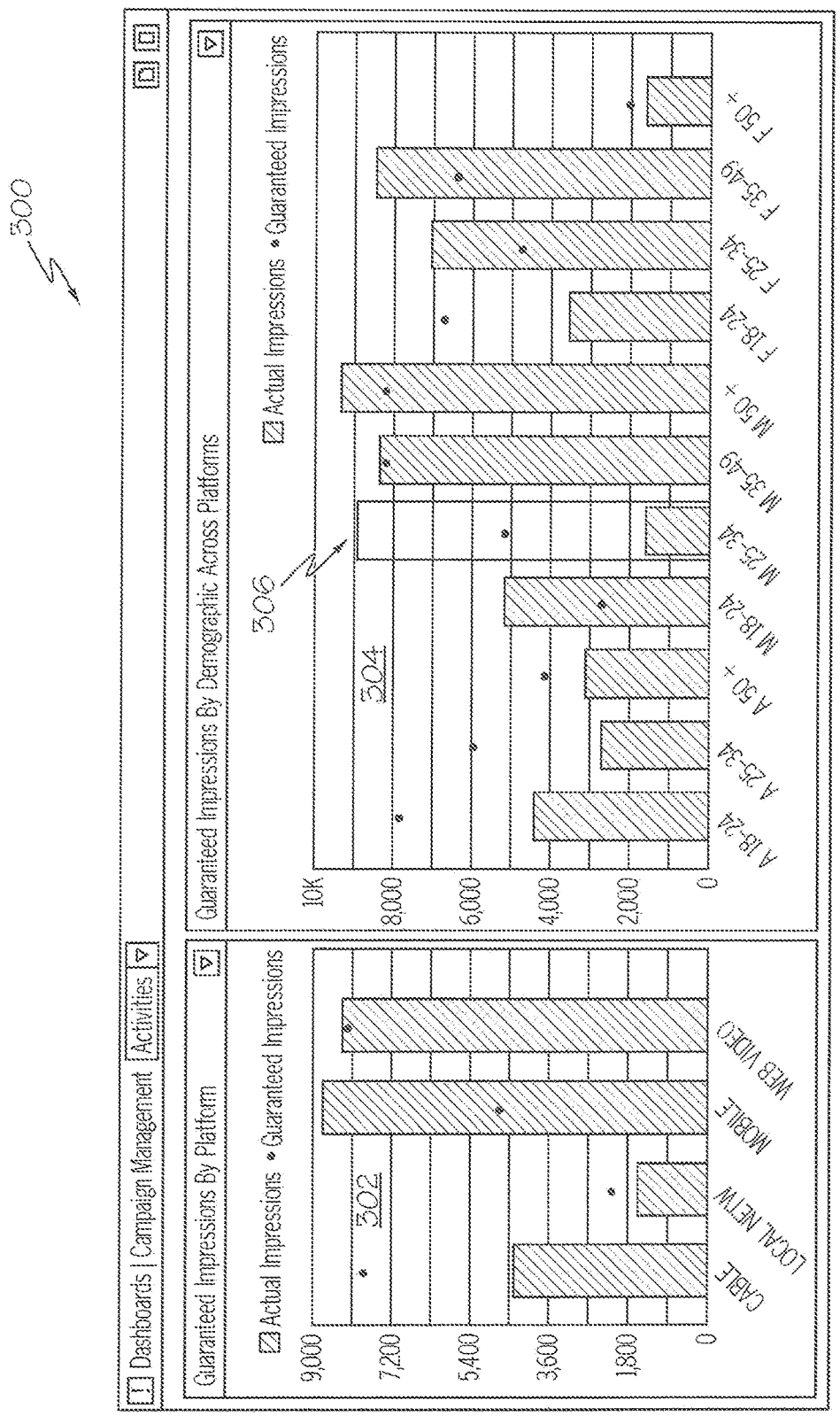
FIG. 3 depicts an exemplary table dashboard for monitoring advertisement effectiveness across multiple disparate platforms in real time.

Consider, for example, dashboard 300 shown in FIG. 3. As depicted in the example described by graph 302, an advertiser (e.g., an enterprise) utilizes four media outlets: cable (e.g., cable television), local networks (e.g., local television and/or radio broadcasting stations), mobile (e.g., smart phones), and web video (e.g., Internet-based web pages on the world wide web). These media outlets are representative of the multiple advertisement platforms 152 shown in FIG. 1. Assume that the advertiser has been guaranteed (e.g., by an advertisement agency or other content providers) that his advertisements are viewed (make "impressions") a certain number of times during a particular time period. For example, the advertiser may be guaranteed that an average of at least 7800 cable television viewers are watching his advertisements at any point in time between noon and 6:00 PM. Furthermore, the advertiser may be guaranteed that his advertisements are being viewed by a minimum of 8100 web video viewers at any point in real-time between noon and 6:00 PM. Thus, the guarantee may be for an average or a point-in-time minimum number of viewers. Dashboard 300 shows, preferably in real time, whether these guarantees are being met, both according to the media in graph 302, as well as by demographics, as shown in graph 304.

Assume now that the impressions on the mobile media were nearly double the guaranteed levels, as depicted in graph 302. An alert (i.e., from alerts 210 shown in FIG. 2) is sent to a user (e.g., an advertising executive who services the advertising needs of an enterprise client, a chief marketing officer—CMO from the enterprise, etc.) or to pre-programmed software logic. The user and/or logic then drill down for more details of what is occurring. These details may come from the media itself (e.g., a wireless news service is sending wireless application protocol—WAP based information about breaking news, a marketing offer, etc.) or it may come from an outside source (e.g., another unrelated news outlet has just announced the breaking news). Assume that this breaking news is that the price of oil has just dropped 10% in the past hour. Such news may be enough for buyers to assume that the price of gas will be cheaper in the future, that the cost of owning a new vehicle will therefore decrease, and therefore that now is a good time to buy a new vehicle. In order to take advantage of this news, the CMO of an automobile manufacturer may then decide in real-time to immediately add new sales banners to webpages on the Internet.

In one embodiment of the present disclosure, an advertisement executive and/or a CMO may reallocate advertisements between different media based on their relative performance. For example, assume that clicking area 306, which corresponds to the column in graph 304 for males between the ages of 25 and 34, pulls up graph 302 just for this demographic. As depicted, the guaranteed impressions for males between the ages of 25 and 34 is not being met by the cable and local networks, but is being greatly exceeded by the mobile media. In order to uniformly spread out the advertisement saturation/penetration, the advertisement executive and/or CMO can reallocate some of the advertisement from the mobile media to the cable and/or local networks. This reallocation can be automatically implemented using software logic such as CPAOAP 148 shown in FIG. 1.

Whether the reallocation of advertisement resources is manual or automatic, the pricing for such reallocated advertisement can be adjusted accordingly, since advertisement that is relevant in real-time is more valuable than that which is not. For example, assume that a financial web site has a 15% spike that is maintained for at least two minutes. The real time BI core 208 (shown in FIG. 2) will collect which content category has the most click through rate (i.e., read by web users), and pass that content category to a Web advertising server (e.g., web advertising server 154 shown in FIG. 1) to automatically adjust advertising rotation priority to achieve higher viewer rating. In this example, assume that a health care related breaking news story causes a higher click through rate for flu related contents. The BI core 208 will send "Health" as a category to the Web advertising server, via an SOA API call, and the Web advertising server then puts higher weighing factors for ready-to-be aired web health related banners. This results in health related banners to have a higher rotation in the advertising queue, preferably in all media used. This automatic process reduces decision time from hours to only minutes to increase the advertising click through rate and to maximize the marketing effect.

Figure 4:
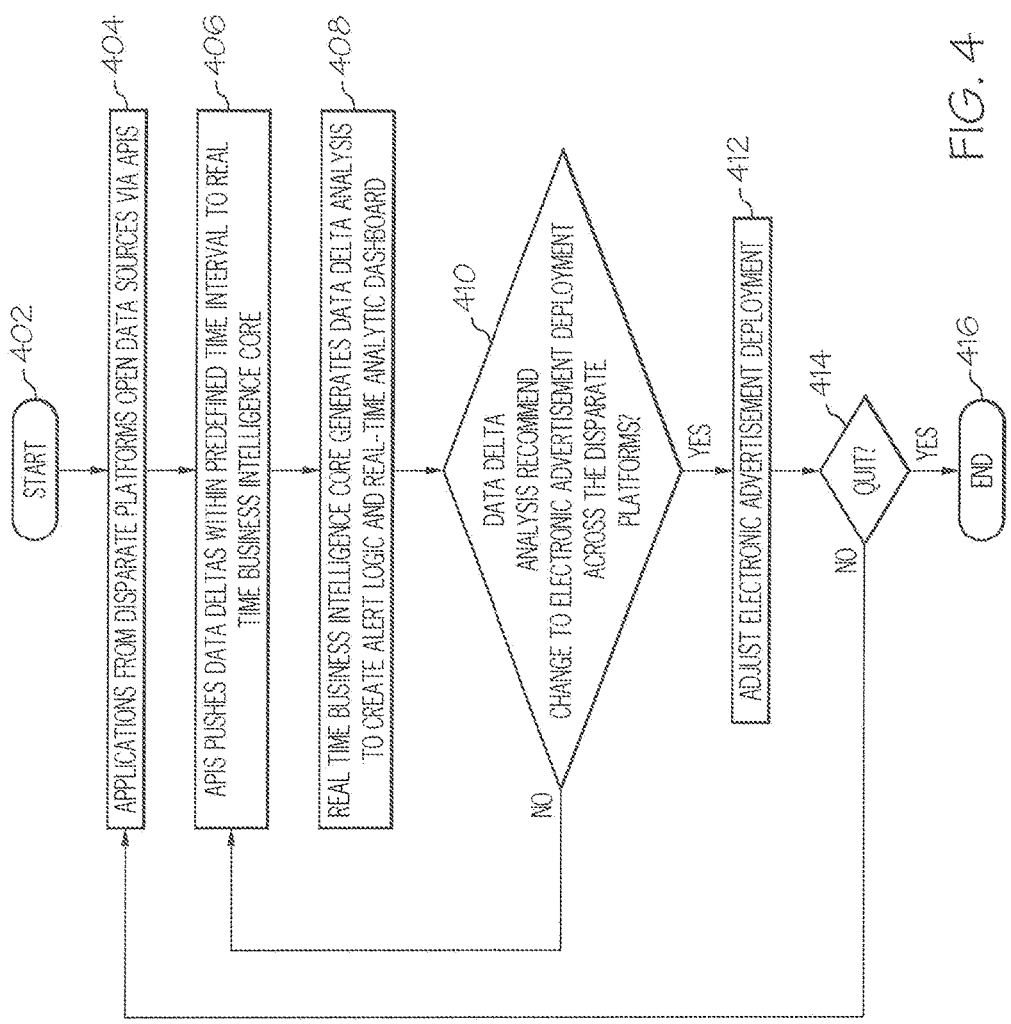
FIG. 4 is a high level flow chart of one or more exemplary steps taken by a processor to optimize placement of electronic advertisements across multiple disparate platforms.

Referring now to FIG. 4, a high level flow chart of exemplary steps, one or more of which are performed by a processor, for managing advertisement placement across disparate advertisement media platforms is presented. After initiator block 402, applications (e.g., LOB applications 204*a-n* shown in FIG. 2) open data sources (disparate advertisement media platforms) via APIs (block 404). That is, each of the disparate advertisement media platforms (web pages, cable television stations/networks, broadcast stations/networks, radio stations/networks, etc.) are coupled to an application that monitors content from the disparate advertisement media platforms as well as content from other sources (including news reports, stock and commodity reports, etc.). The APIs that couple their media platforms (e.g., LOB data sources 202*a-n* shown in FIG. 2) to respective monitoring applications (e.g., LOB applications 204*a-n* shown in FIG. 2) pushes any changes to such content (data) onto a real time business intelligence core, such as the BI core 208 shown in FIG. 2 (block 406). For example, these changes may be an indication that a particular entertainment or news program being broadcast has a viewer spike, thus indicating that additional advertisement related to that program may be warranted in other media platforms. In such an example, assume that the program is a documentary about a famous singer. If the real-time data from the media (e.g., a cable channel having real-time viewer monitoring capability) indicates that there is a large audience for that documentary, then an advertiser may want to insert an advertisement for that singer's latest music compact disk, biography, etc. into an advertisement rotation for that station. Similarly, such an advertisement may also be pushed in real-time onto other media (webpages, radio stations, etc.), on the assumption that the interest in that singer is high at that time for users of such other media. In another embodiment, the cue that there will be a real-time interest may come from another source, such as another news broadcast. That is, assume that an announcement has just been made that the same singer has just announced a world-wide tour. This news announcement may also trigger a public interest in that singer's records, books, etc., which would be immediately advertised in various media.

The real time business intelligence core generates an analysis of the data change (from the monitored medium or from an outside news/data source) to create an alert and/or to generate an input to a real-time analytic dashboard (block 408). Referring again to FIG. 3, assume that it is known that males between the ages of 25 and 34 are the fan-base of this singer, but that they are not being impressed with advertisement related to that singer at sufficient levels on cable and local channels. The BI core 208, which may be a component of the CPAOAP 148 shown in FIG. 1), can then direct additional advertisements related to that singer to be immediately inserted into the advertising rotation on cable and local channels. Similarly, an alert can be generated regarding the recognition of some real-time event. This alert can be used to automatically cause an adjustment in the advertisement allocation, or it can be used to alert a user, who can then decide to adjust the advertisement allocation across and/or among the disparate advertisement media platforms. Thus, as described in query block 410, if the analysis of the data delta recommends a change to where and how the electronic advertisements are deployed across the disparate platforms, then an appropriate adjustment is made. The process continues in a reiterative manner until a decision is made to quit (terminator block 414).

Thus, as describe herein, a computer implemented method, system, and/or computer program product manage electronic advertisement placement across disparate advertisement media platforms (e.g., web pages displayed on a computer, television content being broadcast by cable and/or broadcast television stations, mobile network content being sent from a phone and/or computer network to mobile network receivers such as smart phones, video on demand service content being sent to receivers such as televisions, etc.). These disparate advertisement media platforms are each coupled to a respective monitoring application. The monitoring applications monitor activities occurring within their respective advertisement media (real-time viewer usage data, content such as breaking news, information about the content of a pre-recorded program, etc.). Data describing these activities is utilized as an input to a business intelligence core. In response to one or more of the monitoring applications detecting a real-time event related to a specific subject, the business intelligence core adjusts an amount of electronic advertisement in one or more of the disparate advertising media. As noted above, the real-time event may occur within one or more of the disparate advertising media (i.e., a spike in viewership; a news alert regarding a person, place, thing; etc.), or it may occur outside of the disparate advertising media (such as from a news service, etc.). In one embodiment, advertisement rates are adjusted in response to the real-time event that is related to the specific subject. That is, if the real-time event warrants the immediate insertion of a related advertisement into a medium's advertising rotation, then the cost of airing that advertisement may be adjusted according to its pre-determined rate and worth.

In one embodiment, the business intelligence core adjusts a real-time analytic dashboard to describe an effectiveness of adjusted electronic advertisements across the disparate advertising media in reaching a specific demographic of users, as describe above in FIG. 3. Note that while it is preferable for the business intelligence core to automatically reallocate advertisements across multiple disparate advertisement media platforms, in order to be timely, in one embodiment such reallocation can be controlled by a user, either manually or with the use of logic from the business intelligence core.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of managing advertisement placement across disparate advertisement media platforms, the computer-implemented method comprising:
    coupling multiple disparate advertisement media platforms to respective monitoring applications;
    monitoring activities occurring with the respective advertisement media platforms and utilizing data from the respective monitoring applications to provide inputs to a business intelligence core; and
    the business intelligence core, in response to one or more of the monitoring applications detecting a real-time event related to a specific subject, adjusting an amount of electronic advertisement in one or more of the disparate advertisement media platforms, wherein the real-time event occurs outside of the multiple disparate advertisement media platforms.

2. The computer-implemented method of claim 1, further comprising:
the business intelligence core adjusting the amount of electronic advertisement by reallocating advertisements between different media platforms from the multiple disparate advertisement media platforms.

3. The computer-implemented method of claim 1, wherein the real-time event is a news alert related to the specific subject.

4. The computer-implemented method of claim 1, wherein the disparate advertisement media platforms comprise two or more advertisement media platforms from a group consisting of a computer displaying a web page, a television station broadcasting television content, a mobile network receiver presenting mobile content, and a video on demand service receiver displaying on-demand content.

5. The computer-implemented method of claim 1, further comprising:
adjusting advertisement rates in response to the real-time event that is related to the specific subject.

6. The computer-implemented method of claim 1, further comprising:
the business intelligence core adjusting a real-time analytic dashboard to describe an effectiveness of adjusted electronic advertisements across the advertisement media platforms in reaching a specific demographic of users.

7. A computer system comprising:
a central processing unit (CPU), a computer readable memory, and a computer readable storage media;
first program instructions to couple multiple disparate advertisement media platforms to respective monitoring applications;
second program instructions to monitor activities occurring with the respective advertisement media platforms and utilize data from the respective monitoring applications to provide inputs to a business intelligence core; and
third program instructions for the business intelligence core to, in response to one or more of the monitoring applications detecting a real-time event related to a specific subject, adjust an amount of electronic advertisement in one or more of the advertisement media platforms; and wherein
the first, second and third program instructions are stored on the computer readable storage media for execution by the CPU via the computer readable memory.

8. The computer system of claim 7, wherein the real-time event occurs within one or more of the advertisement media platforms.

9. The computer system of claim 7, wherein the real-time event occurs outside one or more of the advertisement media platforms.

10. The computer system of claim 7, wherein the disparate advertisement media platforms comprise two or more advertisement media platforms from a group consisting of a computer displaying a web page, a television station broadcasting television content, a mobile network receiver presenting mobile content, and a video on demand service receiver displaying on-demand content.

11. The computer system of claim 7, further comprising:
fourth program instructions to adjust advertisement rates in response to the real-time event that is related to the specific subject, wherein the fourth program instructions are stored on the computer readable storage media for execution by the CPU via the computer readable memory.

12. The computer system of claim 7, further comprising:
fourth program instructions to adjust a real-time analytic dashboard to describe an effectiveness of adjusted electronic advertisements across the advertisement media platforms in reaching a specific demographic of users, wherein the fourth program instructions are stored on the computer readable storage media for execution by the CPU via the computer readable memory.

13. A computer program product for managing advertisement placement across disparate advertisement media platforms, the computer program product comprising:
a computer readable storage media;
first program instructions to couple multiple disparate advertisement media platforms to respective monitoring applications;
second program instructions to monitor activities occurring with the respective advertisement media platforms and utilize data from the respective monitoring applications to provide inputs to a business intelligence core; and
third program instructions for the business intelligence core to, in response to one or more of the monitoring applications detecting a real-time event related to a specific subject, adjust an amount of electronic advertisement in one or more of the advertisement media platforms, and wherein
the first, second and third program instructions are stored on the computer readable storage media.

14. The computer program product of claim 13, wherein the real-time event occurs within one or more of the advertisement media platforms.

15. The computer program product of claim 13, wherein the real-time event occurs outside one or more of the advertisement media platforms.

16. The computer program product of claim 13, wherein the disparate advertisement media platforms comprise two or more advertisement media platforms from a group consisting of a computer displaying a web page, a television station broadcasting television content, a mobile network receiver presenting mobile content, and a video on demand service receiver displaying on-demand content.

17. The computer program product of claim 13, further comprising:
fourth program instructions to adjust advertisement rates in response to the real-time event that is related to the specific subject, wherein the fourth program instructions are stored on the computer readable storage media.

18. The computer program product of claim 13, wherein the first, second and third program instructions are provided by a service provider to a customer in an on-demand basis.

* * * * *